(12) United States Patent
Ohara et al.

(10) Patent No.: US 7,800,660 B2
(45) Date of Patent: Sep. 21, 2010

(54) IMAGE DATA PROCESSING CIRCUIT AND IMAGE DATA PROCESSING METHOD

(75) Inventors: Kunihiro Ohara, Kasugai (JP); Tomohiro Fukuoka, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 635 days.

(21) Appl. No.: 11/385,883

(22) Filed: Mar. 22, 2006

(65) Prior Publication Data
US 2007/0139539 A1 Jun. 21, 2007

(30) Foreign Application Priority Data
Dec. 16, 2005 (JP) .............................. 2005-363741

(51) Int. Cl.
H04N 9/64 (2006.01)
H04N 5/228 (2006.01)
(52) U.S. Cl. ..................................... 348/243; 348/222.1
(58) Field of Classification Search ................. 348/243, 348/244, 248, 251, 249, 245, 241, 247, 222.1
See application file for complete search history.

(56) References Cited

U.S. PATENT DOCUMENTS

| | | | |
|---|---|---|---|
| 4,984,085 A | | 1/1991 | Landowski |
| 5,189,528 A | * | 2/1993 | Takashima et al. .......... 358/448 |
| 6,304,292 B1 | * | 10/2001 | Ide et al. ..................... 348/243 |
| 6,700,609 B1 | * | 3/2004 | Abe ............................. 348/243 |
| 7,161,626 B1 | * | 1/2007 | Nara ............................ 348/243 |
| 2004/0263648 A1 | | 12/2004 | Mouli |
| 2005/0083419 A1 | | 4/2005 | Honda et al. |

FOREIGN PATENT DOCUMENTS

| | | |
|---|---|---|
| JP | 2000-156822 A | 6/2000 |
| JP | 2003-319267 A | 11/2003 |

* cited by examiner

*Primary Examiner*—David L Ometz
*Assistant Examiner*—Ahmed A Berhan
(74) *Attorney, Agent, or Firm*—Fujitsu Patent Center

(57) ABSTRACT

An object of the present invention is to provide an image data processing circuit and an image data processing method capable of determining a reference signal level corresponding to black in an image with high precision by suppressing occurrence of line dependency and the like in a dark current component signal included in image data output from a solid state image pickup device. A reference dark current component data holding unit selects a reference line from a solid state image pickup device and holds a dark current component of the reference line as a head line average value. To a subtraction circuit, dark current component data and effective pixel data is sequentially input on the line unit basis. A differential circuit obtains, as a detection value, a change amount with respect to the head line average value, of the dark current component data included in a preceding line. The subtraction circuit subtracts the detection value from the dark current component data and the effective pixel data entered.

10 Claims, 11 Drawing Sheets

CIRCUIT DIAGRAM OF IMAGE DATA PROCESSING CIRCUIT 10a

FIG. 1   PRINCIPLE OF PRESENT INVENTION

FIG. 2 CIRCUIT DIAGRAM OF IMAGE DATA PROCESSING CIRCUIT 10

FIG.4 TIMING CHART (NO. 1) OF IMAGE DATA PROCESSING CIRCUIT 10

TIMING CHART (NO. 2) OF IMAGE DATA PROCESSING CIRCUIT 10

GRAPH (NO. 1) SHOWING CORRELATION BETWEEN DARK CURRENT COMPONENT DATA DD AND LINE COUNT VALUE LC

FIG. 7 CIRCUIT DIAGRAM OF IMAGE DATA PROCESSING CIRCUIT 10a

GRAPH (NO. 2) SHOWING CORRELATION BETWEEN DARK CURRENT COMPONENT DATA DD AND LINE COUNT VALUE LC

DIAGRAM SHOWING PROGRESSIVE CCD SENSOR 5P

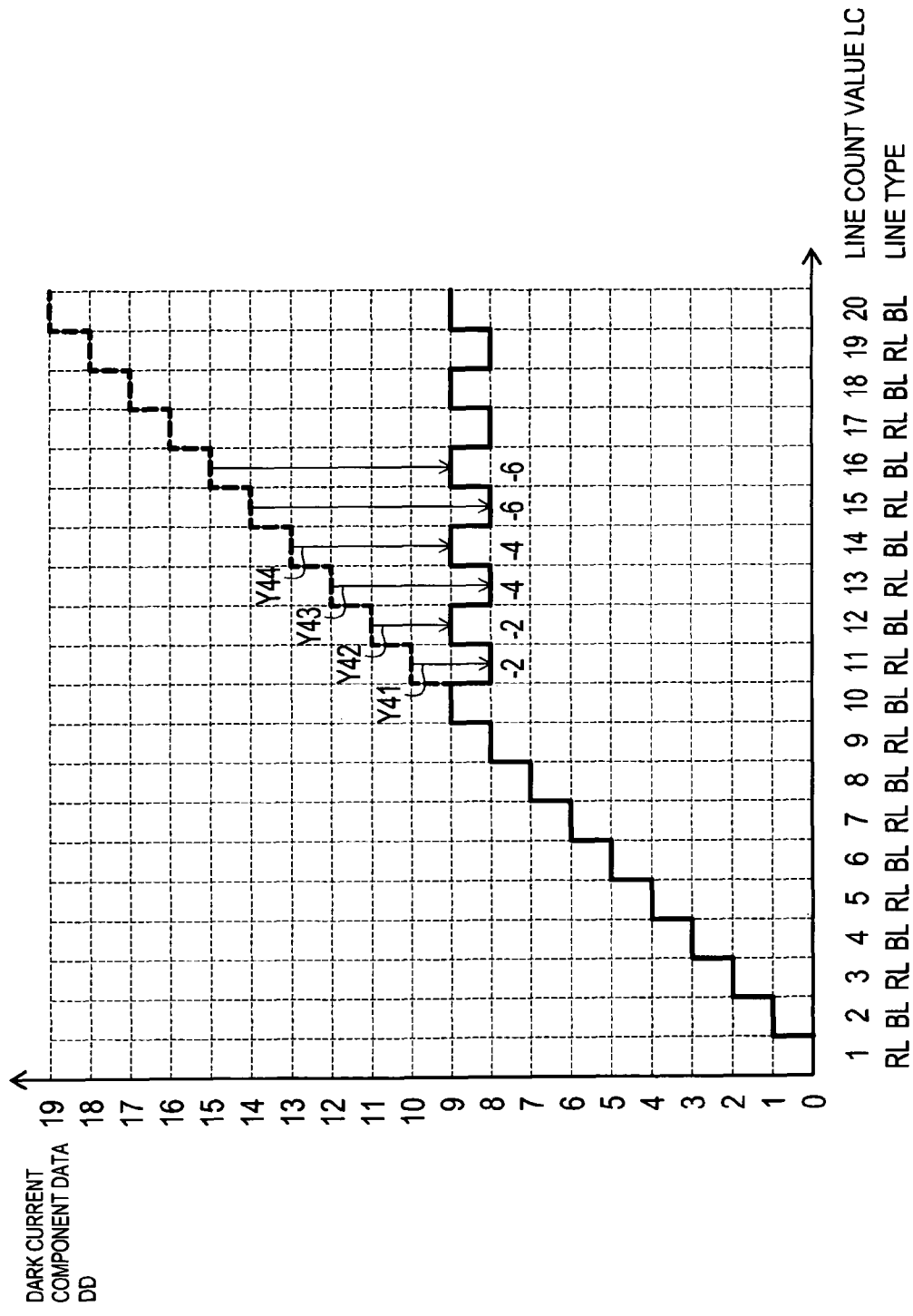

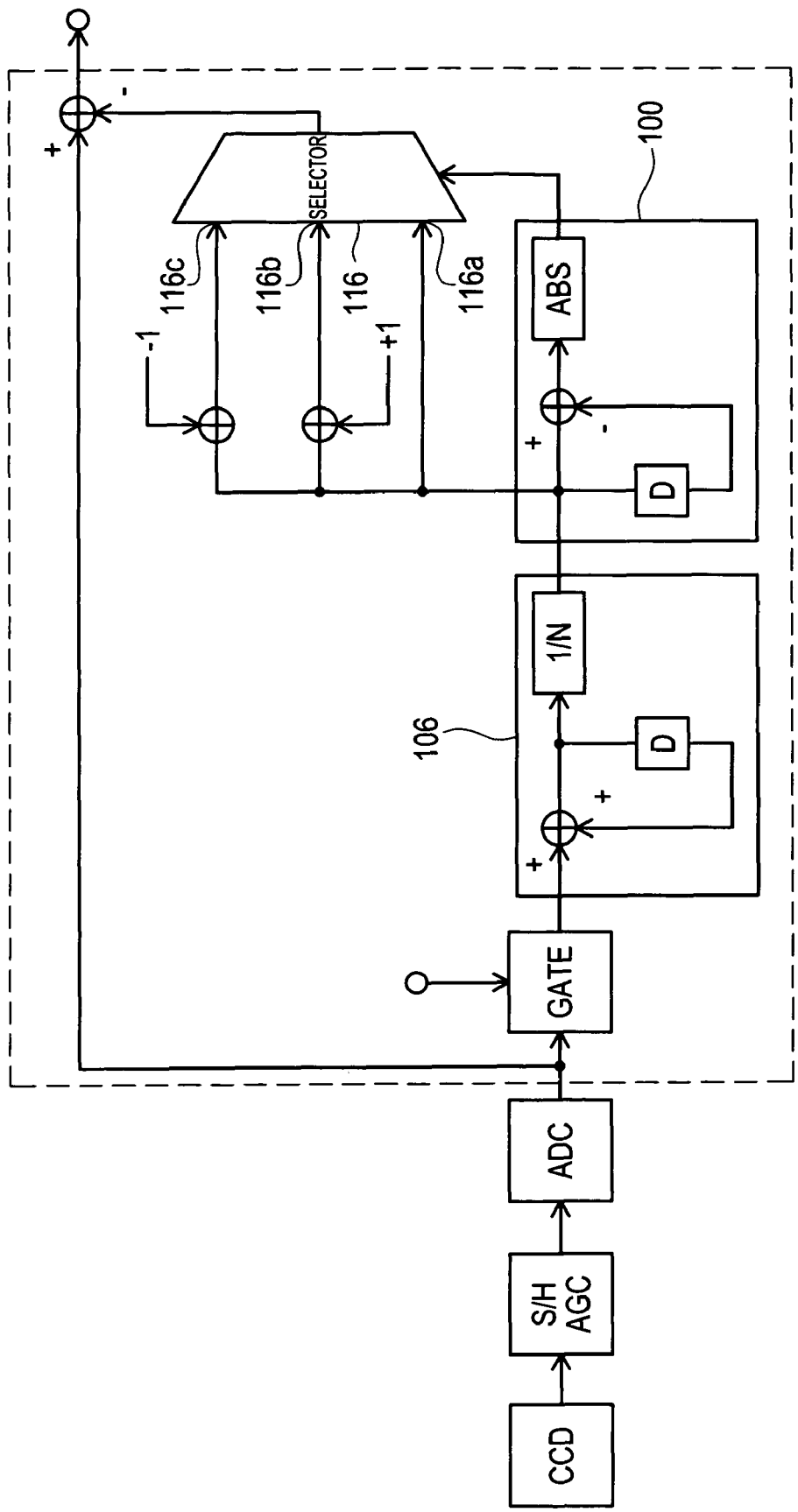
FIG. 11 BLOCK DIAGRAM OF CLAMP CIRCUIT ACCORDING TO CONVENTIONAL TECHNIQUE

IMAGE DATA PROCESSING CIRCUIT AND IMAGE DATA PROCESSING METHOD

CROSS-REFERENCE TO RELATED APPLICATIONS

This application is based upon and claims the benefit of priority from each of the prior Japanese Patent Application No. 2005-363741 filed on Dec. 16, 2005, the entire contents of which are incorporated herein by reference.

BACKGROUND OF THE INVENTION

1. Field of the Invention

The present invention relates to an image data processing circuit and an image data processing method. More particularly, the invention relates to an image process suitable for correcting an optical black part in an output of a solid state image pickup device such as a digital still camera or a digital video camera.

2. Description of Related Art

In a video camera and the like, a CCD (Charge Coupled Device) is used as an image pickup device. An output of the CCD includes not only a photoelectric conversion output generated when light falls on the photosensitive surface of the CCD but also a component of dark current which occurs even when no light falls. Since the dark current also flows while valid pixels are read, the signal level becomes higher as a whole. It causes a problem such that the whole image becomes whitish and black becomes gray. To avoid the phenomenon, correction called OB (Optical Black) correction is made. Specifically, an OB (Optical Black) area which is masked is provided in a CCD, the signal level of the OB area is measured, and a clamp level is obtained. After that, a process of subtracting the clamp level from a signal of a valid pixel is performed. By the process, the component of the dark current is eliminated and only a photoelectric conversion output can be extracted.

FIG. 11 is a block diagram of a clamp circuit of Japanese unexamined patent publication No. 2000-156822. A comparing circuit 100 calculates a differential value "diff" between clamp levels of neighboring lines, calculates an absolute value "abs" of the difference of the clamp levels of the neighboring lines, compares the absolute value "abs" with a predetermined specification "m", and generates a control signal for a selector 116. In the case where the absolute value "abs" is equal to or smaller than the specification "m" (abs≦m), an input terminal 116a is selected. In the case where the absolute value "abs" is larger than the specification "m" (abs>m) and the differential value "diff" between the clamp levels is larger than zero (diff>0), an input terminal 116b is selected. When the absolute value of the difference between the clamp levels of the neighboring lines is within a predetermined range, the clamp level of each line output from an integrating and averaging circuit 106 is used as it is. When the absolute value is larger than the predetermined range, it is updated by +1 or -1. In such a manner, the clamp level is updated on the line unit basis.

As a technique related to the above, Japanese unexamined patent publication No. 2003-319267 is disclosed.

SUMMARY OF THE INVENTION

In the clamp circuit of Japanese unexamined patent publication No. 2000-156822, however, the clamp level is updated only by +1 or -1 every line. In the case where the signal level in the OB area changes more than the clamp level +1 or -1 between lines, a situation that OB correction cannot be performed sufficiently occurs and it is a problem. Also in the case where the signal level of the OB area changes within the clamp level, the precision of OB correction deteriorates and it is a problem. When the interval of updating the clamp level is narrowed (for example, to ±0.5) in order to increase precision of OB correction, a correctable range is narrowed, a situation occurs that the circuit cannot deal with the case where the clamp level difference between lines is large, and this is a problem. There is another problem such that the line dependency as a characteristic that the signal level of the OB area changes on the line unit basis appears more conspicuously as the number of pixels of the CCD increases. When the signal level of the OB area has the line dependency, at the time of subtracting the clamp level obtained by measuring the signal level of the OB area in a later image process, a situation that the dark current component cannot be completely eliminated occurs.

The present invention has been achieved to solve at least one of the drawbacks of the background art. According to the invention, high precision correction can be performed so as to suppress occurrence of line dependency and variations among lines in a dark current component signal included in image data output from a solid state image pickup device, and occurrence of line flicker can be prevented. Therefore, a reference signal level corresponding to black in an image is determined with high precision, and signals of all of valid pixels can be corrected with the determined reference signal level.

To achieve the purpose above, there is provided an image data processing circuit of a solid state image pickup device from which a dark current component signal and a pixel signal are sequentially output on a line unit basis, comprising: a first holding circuit for holding the dark current component signal in a reference line as a reference dark current component signal; a first subtraction circuit to which the dark current component signal and the pixel signal are sequentially entered on the line unit basis; and a differential circuit for obtaining, as a dark current change amount, a change amount with respect to the reference dark current component signal, of the dark current component signal included in a preceding line output from the solid state image pickup device prior to the line entered to the first subtraction circuit, wherein the first subtraction circuit subtracts the dark current change amount from the dark current component signal and the pixel signal which are entered.

Examples of the solid state image pickup device are a CCD sensor and a CMOS sensor. A pixel signal is output from an effective pixel area. A dark current component signal is a signal according to a current component generated when no light falls on a photosensitive surface of the solid state image pickup device. The dark current component is also included in the pixel signal. Therefore, with respect to the relation between a pixel signal and a dark current component signal in the same line, the dark current component signal expresses the dark current component included in the pixel signal.

A first holding circuit holds the dark current component signal in a reference line as a reference dark current component signal. A single line or a plurality of lines may be used as the reference line(s). The reference line is not limited to the head line in the solid state image pickup device. To a first subtraction circuit, a dark current component signal and a pixel signal are sequentially entered on the line unit basis. A differential circuit obtains, as a dark current change amount, a change amount with respect to the reference dark current component signal, of a dark current component signal included in a preceding line output from the solid state image pickup device prior to a line entered to the first subtraction circuit. A single line or a plurality of lines may be used as the preceding line(s). The first subtraction circuit subtracts the dark current change amount from the dark current component signal and the pixel signal entered.

By the subtracting process, the value of the dark current component signal and the value of the dark current component included in the pixel signal can be corrected according to the reference dark current component signal. As a result, the value of the dark current component can be set to a predetermined value. That is, occurrence of, for example, line dependency such that the dark current increases/decreases according to increase in the number of lines and variations among lines in the value of the dark current component signal and the value of the dark current component included in the pixel signal can be suppressed. Consequently, at a later image process stage, variations among lines and line dependency do not occur and the dark current component signal can be eliminated from the pixel signal. Thus, the reference signal level corresponding to black in an image can be determined with high precision, and all of pixel signals can be corrected with the determined reference signal level.

The first subtraction circuit subtracts the dark current change amount from the pixel signal and the dark current component signal. Therefore, irrespective of the dark current change amount, the value of the dark current component signal in each line can be corrected according to the reference dark current component signal with high precision. As a result, the value of the dark current component can be set to a predetermined value.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 7 is a circuit diagram of an image data processing circuit 10a;

FIG. 10 is a graph (No. 3) showing the correlation between the dark current component data DD and the line count value LC; and FIG. 11 is a block diagram of a clamp circuit according to the conventional technique.

DETAILED DESCRIPTION OF THE PREFERRED EMBODIMENTS

Figure 1:
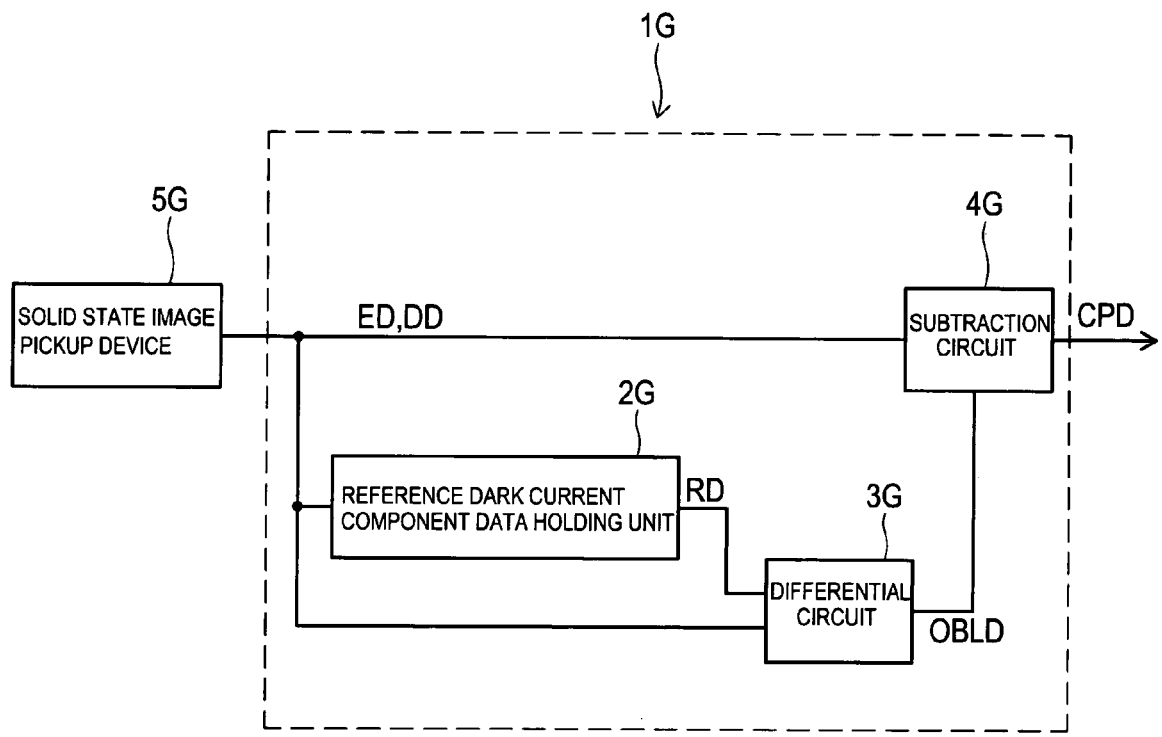
FIG. 1 is a diagram showing the principle of the present invention.

Embodiments of an image data processing circuit and an image data processing method of the present invention will be described in detail hereinbelow with reference to FIGS. 1 to 10. FIG. 1 is a diagram showing the principle of the present invention. A correction circuit 1G has a reference dark current component data holding unit 2G, a differential circuit 3G, and a subtraction circuit 4G. A solid state image pickup device 5G has a plurality of lines in one frame. Each of the lines has an effective pixel area for obtaining effective pixel data ED and a light shield area for obtaining dark current component data DD. From the solid state image pickup device 5G, the effective pixel data ED and the dark current component data DD is output. Since the dark current is generated also in the effective pixel area, the dark current component data DD shows a value equivalent to that of the dark current component included in the effective pixel data ED output from the same line.

The reference dark current component data holding unit 2G selects a reference line in the solid state image pickup device 5G and holds the dark current component of the reference line as a head line average value RD. It is preferable to set the head line output from the solid state pickup device 5G as a reference line. To the subtraction circuit 4G, the dark current component data DD and the effective pixel data ED is sequentially entered on the line unit basis. The differential circuit 3G obtains, as a detection value OBLD, a change amount with respect to the head line average value RD, of the dark current component data DD included in preceding line which is output from the solid state image pickup device 5G prior to the line (to which the dark current component data DD and the effective pixel data ED is entered) entered to the subtraction circuit 4G. The subtraction circuit 4G subtracts the detection value OBLD from the entered dark current component data DD and effective pixel data ED. From the subtraction circuit 4G, corrected pixel data CPD obtained by subtraction is output.

In such a manner, the detection value OBLD obtained on the line unit basis can be subtracted from the effective pixel data ED and the dark current component data DD of each line. Therefore, also in the case where the dark current component data DD increases/decreases on the line unit basis, the value of the dark current component data DD of each line can be corrected according to the head line average value RD. Consequently, variations in the dark current component data DD among lines and line dependency of the dark current component data DD can be suppressed. In a later image process stage, there are no variations among lines and no line dependency, and the dark current component data DD can be eliminated from the effective pixel data ED. Thus, the reference signal level corresponding to black in an image is determined with high precision, and all of effective pixel data ED can be corrected with the determined reference signal level.

Figure 2:
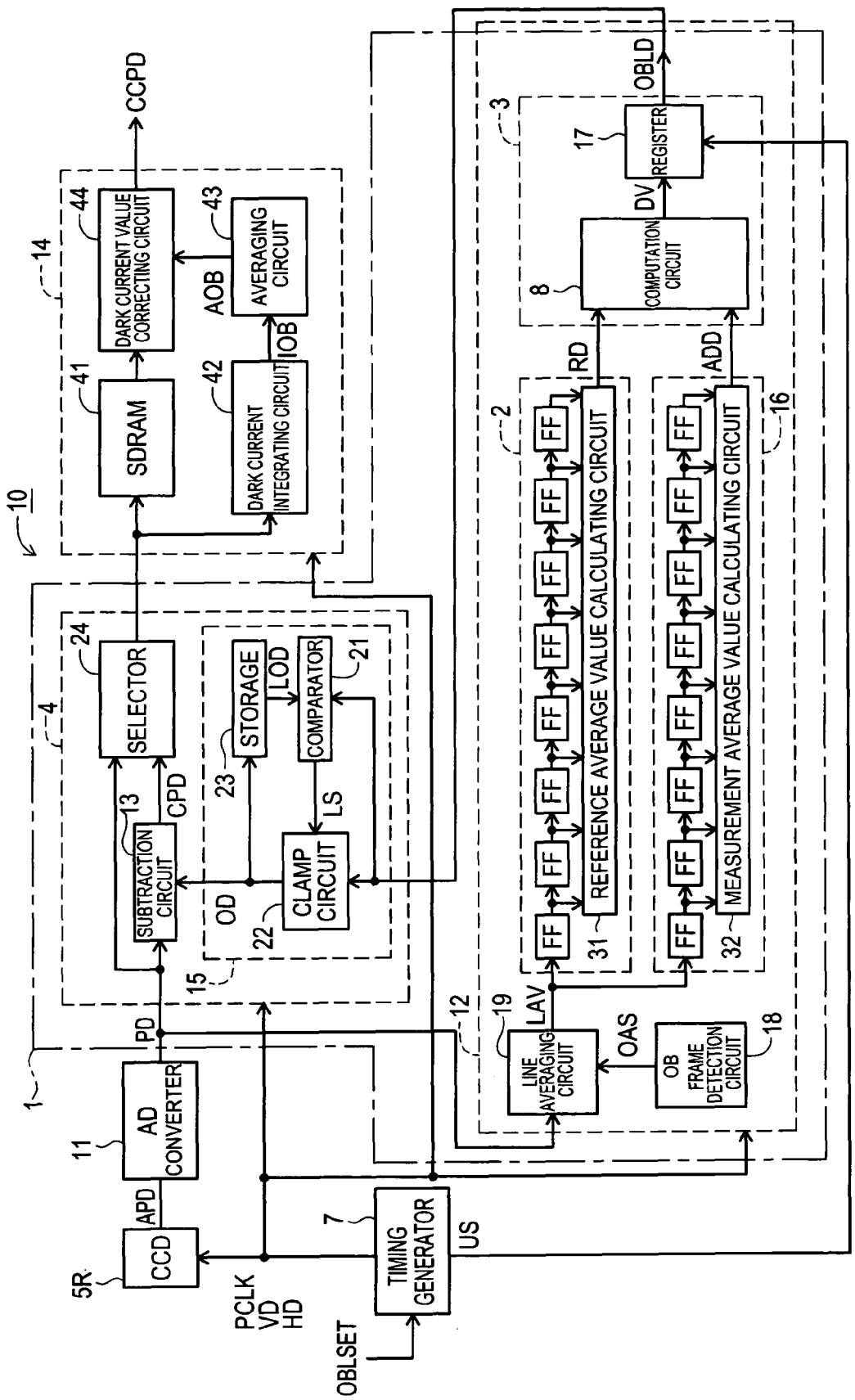
FIG. 2 is a circuit diagram of an image data processing circuit 10.

An image data processing circuit 10 according to a first embodiment of the invention will be described by referring to FIG. 2. The image data processing circuit 10 has a CCD sensor 5R of R fields, a timing generator 7, an AD converter 11, a correction circuit 1, and a frame OB correcting unit 14. The correction circuit 1 has a detector 12 and a line OB correcting unit 4.

Figure 3:
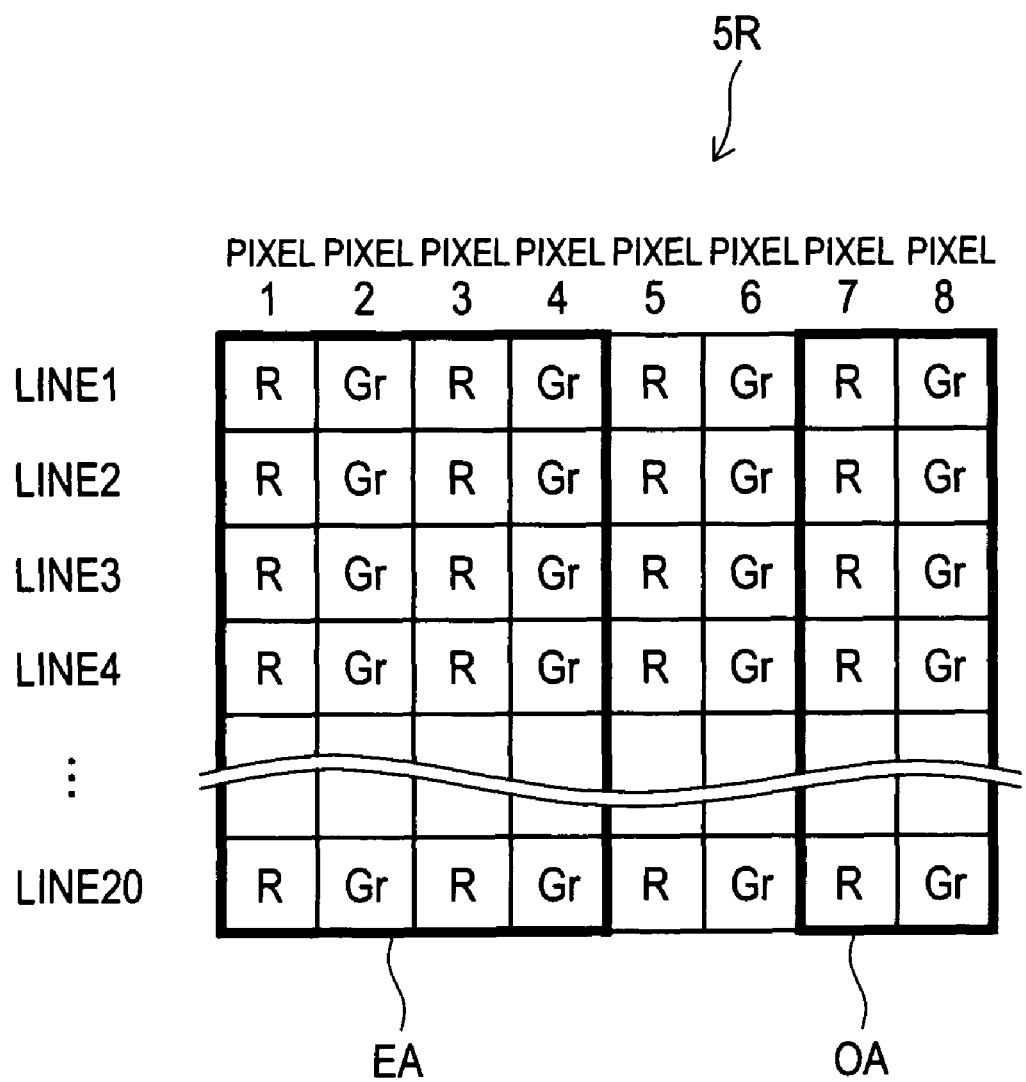
FIG. 3 is a diagram showing R fields of an interlace CCD sensor.

FIG. 3 shows R fields in the interlace CCD sensor 5R. In the CCD sensor 5R, for convenience of explanation, it is assumed that the number of lines is 20 and there are eight pixels per line. The effective area EA and the OB area OA are pre-set in the CCD sensor 5R by a not-shown register. The effective area EA is an area for obtaining the effective pixel data ED. The OB area OA is an OB (Optical Black) part as a shielded pixel area and is an area for obtaining the dark current component data DD. The CCD sensor 5R outputs analog pixel data APD. The AD converter 11 converts the analog pixel data APD to digital data, and outputs the digital data as pixel data PD. The pixel data PD includes the effective pixel data ED and the dark current component data DD. For also the B fields in the interlace CCD sensor, an image data processing circuit is provided. Since the circuit configuration is similar to that of the image data processing circuit for the R fields, the detailed description will not be repeated here.

To the timing generator 7, an update frequency set value OBLSET is entered. A pixel clock PCLK, a vertical sync signal VD, and a horizontal sync signal HD are output from the timing generator 7 and entered to the CCD sensor 5R, line OB correcting unit 4, detector 12, and frame OB correcting unit 14. An update signal US is also output from the timing generator 7 and is entered to a register 17.

The detector 12 has a line averaging circuit 19, an OB frame detection circuit 18, a reference average value generating circuit 2, a measurement average value generating circuit 16, a differential circuit 3, and the register 17. To the line averaging circuit 19, the pixel data PD output from the AD converter 11 and an OB area detection signal OAS output from the OB frame detection circuit 18 are input. A dark current average value LAV output from the line averaging circuit 19 is entered to the reference average value generating circuit 2 and the measurement average value generating circuit 16. The reference average value generating circuit 2 has a shift register constructed by eight flip flops FF and a reference average value calculating circuit 31. The head line average value RD is output from the reference average value calculating circuit 31. Similarly, the measurement average value generating circuit 16 has a shift register constructed by eight flip flops FF and a measurement average value calculating circuit 32. A preceding line average value ADD is output from the measurement average value calculating circuit 32.

The differential circuit 3 has a computation circuit 8 and the register 17. To the computation circuit 8, the head line average value RD and the preceding line average value ADD are entered. The computation circuit 8 computes a change amount DV as a change amount with respect to the head line average value RD, of the preceding line average value ADD. When the change amount DV is a positive value, the computation circuit 8 outputs the change amount DV to the register 17. On the other hand, when the change amount DV is a negative value, the change amount DV clipped to "0" is output to the register 17. In the case where it is known that the change amount DV is always made a positive value, the change amount DV can be prevented from becoming an error value by the clipping operation. Therefore, occurrence of line flicker can be prevented. To the register 17, the change amount DV and the update signal US are entered. From the register 17, the detection value OBLD is output.

The line OB correcting unit 4 has a subtraction circuit 13, a limiter 15, and a selector 24. The limiter 15 has a comparator 21, a clamp circuit 22, and a storage 23. To the comparator 21, the detection value OBLD and a correction value LOD of last time which is output from the storage 23 are supplied. A limit signal LS is output from the comparator 21. The clamp circuit 22 outputs a correction value OD to the subtraction circuit 13 and the storage 23. The pixel data PD is entered to the subtraction circuit 13 and the corrected pixel data CPD is output.

The selector 24 selects either the pixel data PD or the corrected pixel data CPD and outputs the selected data to the frame OB correcting unit 14.

The frame OB correcting unit 14 has an SDRAM 41, a dark current value integrating circuit 42, an averaging circuit 43, and a dark current value correcting circuit 44. The output terminal of the line OB correcting unit 4 is connected to the SDRAM 41 and the dark current value integrating circuit 42. An integrated dark current value IOB output from the dark current value integrating circuit 42 is entered to the averaging circuit 43. An averaged dark current value AOB output from the averaging circuit 43 is entered to the dark current value correcting circuit 44. To the dark current value correcting circuit 44, the output terminal of the SDRAM 41 and the output terminal of the averaging circuit 43 are connected. Corrected pixel data CCPD is output from the dark current value correcting circuit 44 and is supplied to a not-shown circuit in a post stage.

The action of the image data processing circuit 10 will be described. From the CCD sensor 5R of the R fields, the effective pixel data ED and the dark current component data DD is output in order from line 1 to line 20. As an example, the case where the value of the dark current component data DD in each line increases one by one in proportional to the line count value LC as shown by the broken line (before correction) of FIG. 6 will be described.

Figure 4:
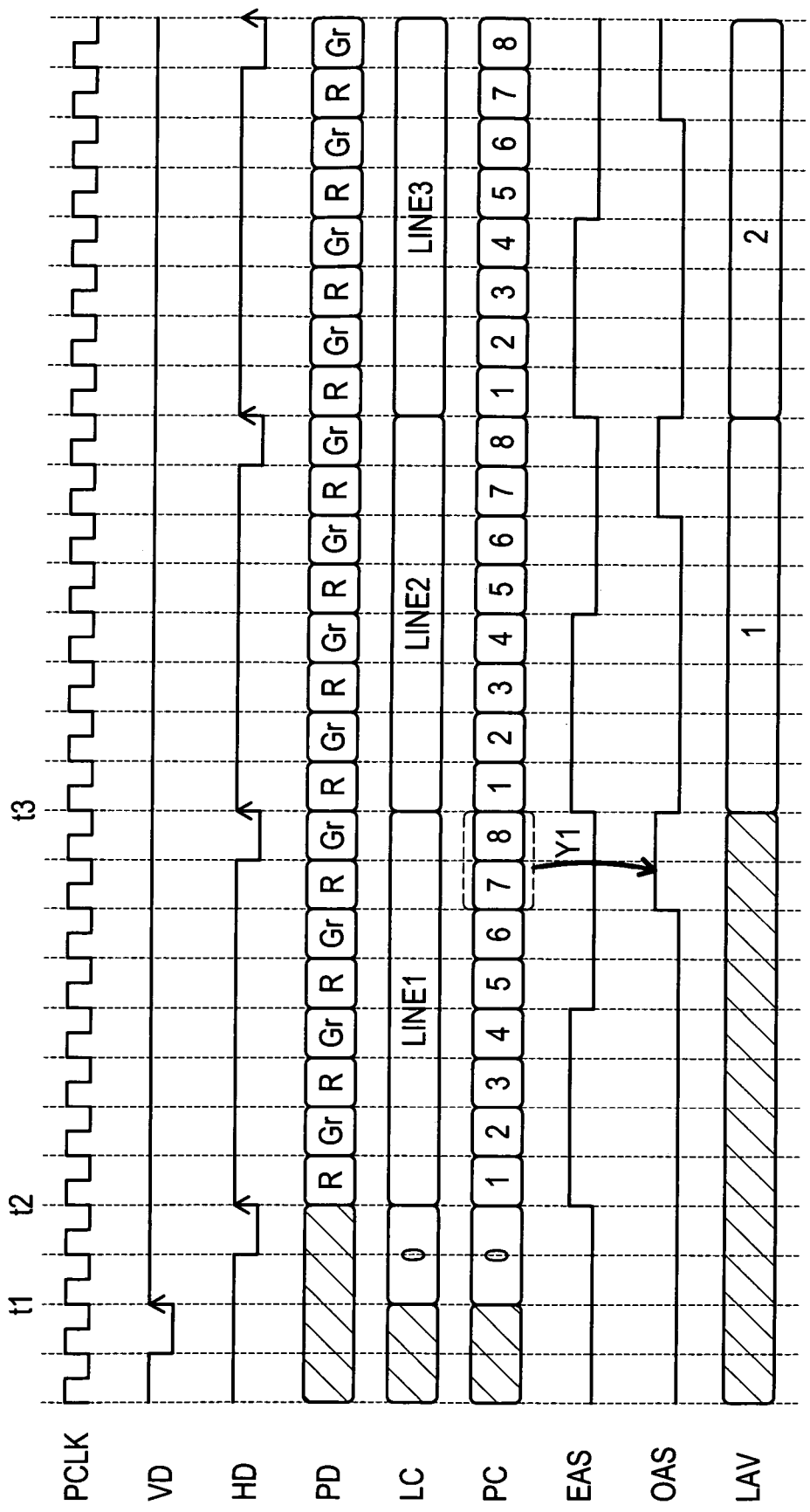
FIG. 4 is a timing chart (No. 1) of the image data processing circuit 10.

The operation of the detector 12 will be described by using the timing chart of FIG. 4. At time t1, data capturing of the CCD sensor 5R starts in response to the rising edge of the vertical sync signal VD supplied from the timing generator 7. At time t2, the line count value LC of a not-shown line counter is set to 1 in response to the rising edge of the horizontal sync signal HD. The line counter is a counter indicative of the vertical address of the pixel data PD, and the line count value LC is increased in response to the rising edge of the horizontal sync signal HD.

The pixel data PD is output on the pixel data unit basis in response to the pixel clock PCLK. A not-shown pixel counter is a counter indicative of the horizontal address of the pixel data PD. The pixel count value PC is increased in response to the rising edge of the pixel clock PCLK.

The OB frame detection circuit 18 outputs the OB area detection signal OAS of the high level to the line averaging circuit 19 in the period in which the pixel count value PC is 7 and 8 (arrow Y1). The signal notifies the line averaging circuit 19 of the fact that the data in the seventh and eighth pixels in the line 1 belonging to the OB area OA in the CCD sensor 5R (FIG. 3) is entered. In accordance with the OB area detection signal OAS, the line averaging circuit 19 captures the dark current component data DD in the seventh and eighth pixels in the line 1 belonging to the OB area OA, obtains the average value of the dark current component data DD of the seventh and eighth pixels, and outputs the resultant value as the dark current average value LAV. In such a manner, the line averaging circuit 19 performs the operation of selectively receiving only the dark current component data DD from the pixel data PD entered and calculating the dark current average value LAV.

At time t3, the entry of the pixel data PD of the line 1 completes in response to the rising edge of the horizontal sync signal HD and the entry of the pixel data PD of the line 2 starts. In the line averaging circuit 19, the dark current average value LAV (=1) in the line 1 is obtained. The obtained dark current average value LAV is supplied to the flip flop FF in the first stage in the reference average value generating circuit 2 and the flip flop FF in the first stage in the measurement average value generating circuit 16.

Figure 5:
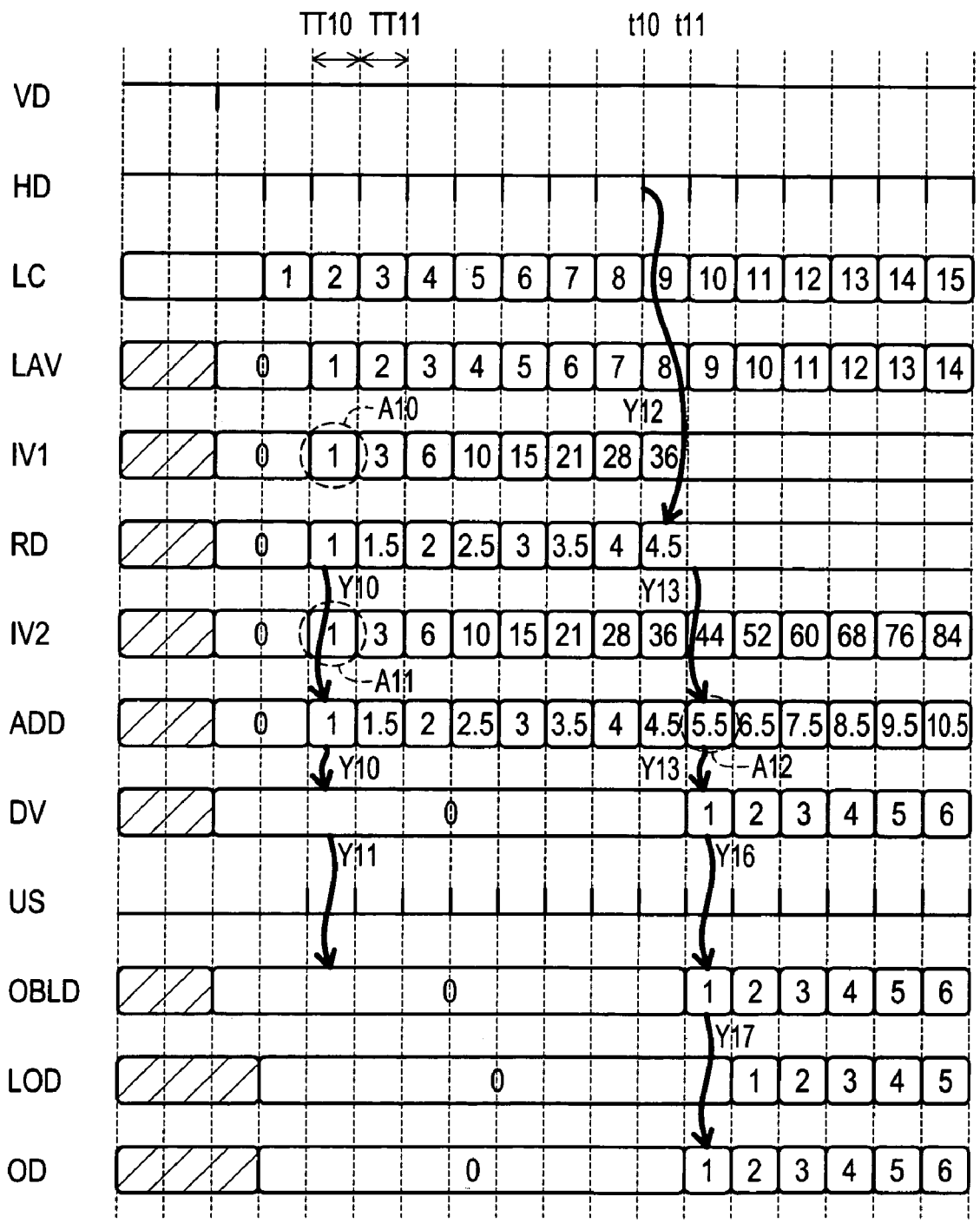
FIG. 5 is timing chart (No. 2) of the image data processing circuit 10.

The operations of the reference average value generating circuit 2 and the measurement average value generating circuit 16 will be described by using the timing chart of FIG. 5. The reference average value generating circuit 2 performs the operation of calculating an average value of the dark current average values LAV in the lines 1 to 8 and holding the calculation result as the head line average value RD. The measurement average value generating circuit 16 performs the operation of calculating an average value of the dark current average values LAV in a selected line and seven lines preceding the selected line and outputting the calculation result as the preceding line average value ADD.

First, in the period TT10, the shift register of the reference average value generating circuit 2 obtains an integrated value IV1 (=1) of the dark current average value LAV of the line 1 (area A10). The reference average value calculating circuit 31 calculates the head line average value RD (=1). Similarly, the shift register of the measurement average value generating circuit 16 obtains an integrated value IV2 (=1) of the dark current average value LAV in the line 1 in the period TT10 (area A11). The measurement average value calculating circuit 32 calculates the preceding line average value ADD (=1). As described above, in the period TT10, both of the head line average value RD and the preceding line average value ADD are equal to 1.

The computation circuit 8 calculates the change amount of the preceding line average value ADD from the head line average value RD, and the change amount DV=0 is obtained (arrow Y10). The change amount DV is registered in the register 17 in response to the update signal US (arrow Y11). The detection value OBLD (=0) is output from the register 17 to the line OB correcting unit 4.

Similarly, to time t10, the dark current average value LAV increases like 2, 3, 4, . . . 7 and the integrated values IV1 and IV2 increase like 3, 6, 10, . . . 28. The head line average value RD and the preceding line average value ADD increase like 1.5, 2, 2.5, . . . 4, and the change value DV remains zero.

When the entry of the pixel data PD in the line 8 completes at time t10, capture of the head line average value RD completes, and updating of the integrated value IV1 is stopped. Therefore, after time t10, the value of the head line average value RD is set as a constant value of 4.5 (arrow Y12).

When the entry of the line 9 completes at time t11 and the program shifts to the entry of the line 10, the measurement average value generating circuit 16 obtains the preceding line average value ADD (=5.5) of the lines 2 to 9 (area A12). Then, the value of the change amount DV becomes 1 (=5.5−4.5) (arrow Y13). Since the change amount DV (=1) is a positive value, the computation circuit 8 outputs the change amount DV of 1 to the register 17. In response to the update signal US, the register 17 captures the change amount DV (=1) (arrow Y16). Therefore, the detection value OBLD is set to 1.

The operation of the line OB correcting unit 4 will now be described. The detection value OBLD output from the register 17 is entered to the limiter 15 of the line OB correcting unit 4. The limiter 15 is a circuit for limiting the correction value OD for the present line so as not to change largely from the correction value OD for the immediately preceding line. First, the comparator 21 obtains a change amount VV from the correction value LOD of last time which is held in the storage 23, of the detection value OBLD of the line being presently entered to the subtraction circuit 13. The comparator 21 determines whether the change amount VV increases over an increase permitted value OBLTH or not and determines whether the change amount VV decreases over a decrease permitted value OBLTL or not.

In the case where the change amount VV increases over the increase permitted value OBLTH, the fact is notified to the clamp circuit 22 by a limit signal LS. The clamp circuit 22 sets the value obtained by adding the increase permitted value OBLTH to the correction value LOD of last time as a correction value OD for the present line, and outputs the correction value OD to the subtraction circuit 13 and the storage 23. In the case where the change amount VV decreases over the decrease permitted value OBLTL, the fact is notified to the clamp circuit 22 by the limit signal LS. The clamp circuit 22 sets a value obtained by subtracting the decrease permitted value OBLTL from the correction value LOD of last time as a correction value OD for the present line, and outputs the correction value OD to the subtraction circuit 13 and the storage 23. In the case where the change amount VV lies in the range from the increase permitted value OBLTH to the decrease permitted value OBLTL, the clamp circuit 22 sets the detection value OBLD itself as the correction value OD for the present line, and outputs the correction value OD to the subtraction circuit 13 and the storage 23.

Figure 6:
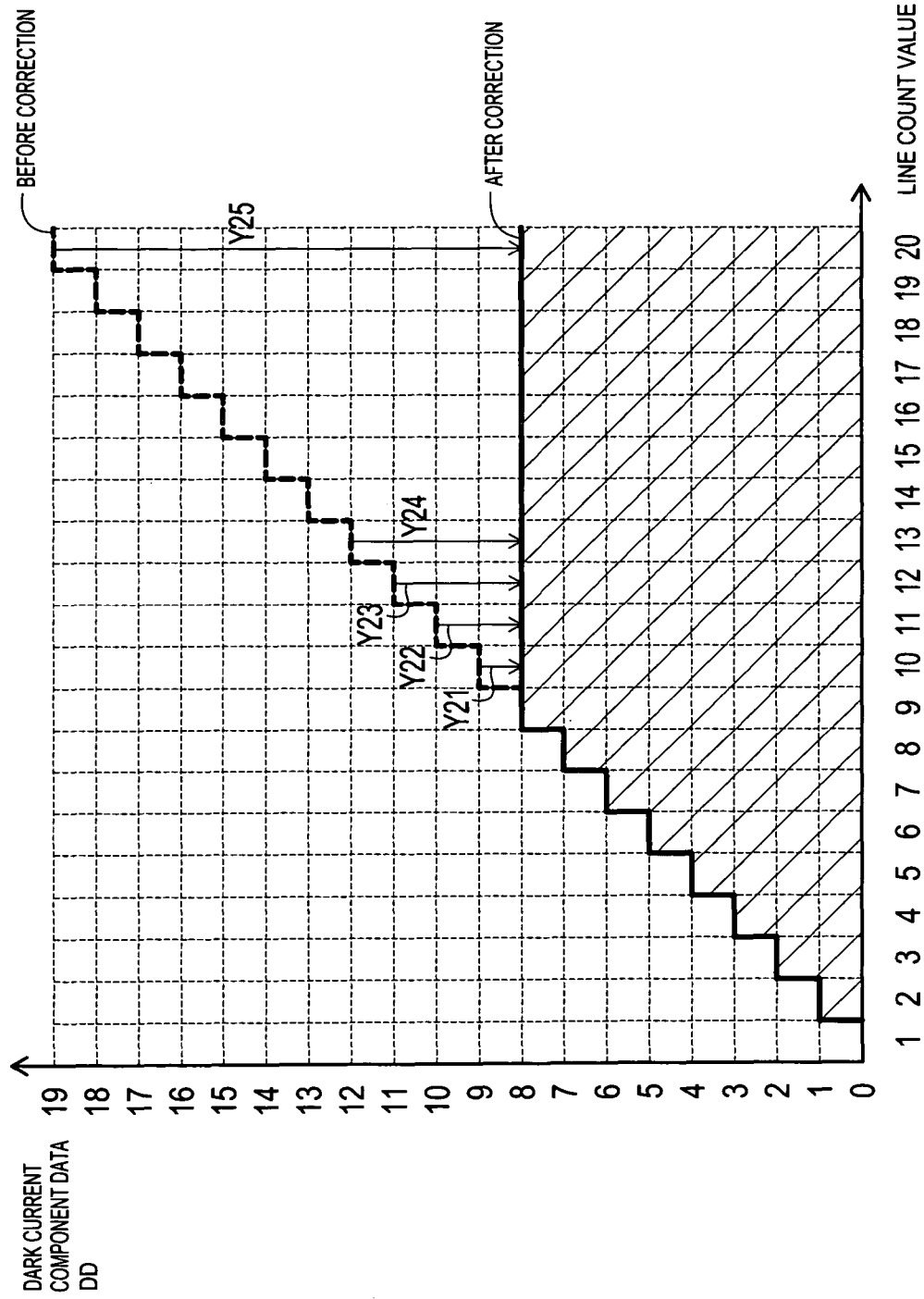
FIG. 6 is a graph (No. 1) showing the correlation between dark current component data DD and a line count value LC.

The case where the pixel data PD of the line 10 is entered to the subtraction circuit 13 will be described. For example, the case where the increase permitted value OBLTH is set to 2 and the decrease permitted value OBLTL is set to −2 will be described. The comparator 21 obtains the change amount VV (=1) of the detection value OBLD (=1) of the line 10 from the correction value LOD (=0) of last time of the line 9 held in the storage 23. Since the change amount VV of 1 is within the range of the increase permitted value OBLTH and the decrease permitted value OBLTL, the clamp circuit 22 employs the detection value OBLD (=1) as the correction value OD for the present line (arrow Y17 in FIG. 5). The correction value OD is output to the subtraction circuit 13 and the storage 23. The subtraction circuit 13 subtracts the correction value OD (=1) from the pixel data PD of the line 10 entered. By the operation, as shown in FIG. 6, the dark current component data DD in the line 10 is decreased from 9 to 8 (arrow Y21).

Similarly, in the lines 11, 12, 13, . . . and 20, the correction values OD=2, 3, 4, . . . and 11 are subtracted from the dark current component data DD=10, 11, 12, . . . , and 19, respectively (arrows Y22 to Y25). Therefore, at the line count value LC of 10 and larger values, the value of the dark current component data DD can be set to a predetermined value (=8).

The reference average value generating circuit 2 holds the head line average value RD by calculating an average of the dark current average values LAV in the lines 1 to 8. The differential circuit 3 obtains the preceding line average value ADD in the preceding lines (for example, eight lines from line 2 to line 9) output from the CCD sensor 5R prior to the line (for example, line 10) from which data is supplied to the subtraction circuit 13, and obtains, as the detection value OBLD, the change amount with respect to the head line average value RD, of the preceding line average value ADD. The subtraction circuit 13 subtracts the detection value OBLD from the effective pixel data ED and the dark current component data DD of the line (line 10) obtained by the subtraction circuit 13. By the operation, variations among the lines of the dark current component included in the effective pixel data ED are reduced, and variations among the lines of the dark current component data DD are reduced. By sequentially updating data from the preceding line and the lines from which data is entered to the subtraction circuit 13, variations among lines of the dark current component can be eliminated from data of one frame of an image.

The action of the frame OB correcting unit 14 will be described. The corrected pixel data CPD obtained by eliminating variations among lines and line dependency of the dark current component data DD is output from the line OB correcting unit 4 and entered to the SDRAM 41 and the dark current integrating circuit 42 in the frame OB correcting unit 14. The SDRAM 41 captures data of corrected effective pixel data CED belonging to the effective area EA from the corrected pixel data CPD entered. The dark current value integrating circuit 42 selectively captures the corrected dark current component data CDD belonging to the OB area OA from the corrected pixel data CPD, integrates the data, and outputs the dark current integrated value IOB. In FIG. 6, the value of the dark current integrated value IOB of lines 1 to 20 is 144 (the hatched area in FIG. 6). The averaging circuit 43 calculates the averaged dark current value AOB per pixel in the OB area OA. In FIG. 6, the averaged dark current value AOB is 7.2. The dark current value correcting circuit 44 subtracts the averaged dark current value AOB from the corrected effective pixel data CED captured in the SDRAM 41 pixel by pixel, thereby obtaining the corrected pixel data CCPD. Since the averaged dark current value AOB indicates the value of the dark current component included in the corrected effective pixel data CED of one frame in an image as described above, the dark current component is completely eliminated from the corrected pixel data CCPD. Obviously, the frame OB correcting unit 14 performs the above-described correcting operation not only in the case where the corrected pixel data CPD is entered but also in the case where the pixel data PD is entered.

For the B fields of the CCD sensor, a circuit similar to the image data processing circuit 10 is provided and similar operation is performed, but the detailed description will not be given here. By combining the corrected pixel data CCPD output from the R fields and the corrected pixel data CCPD output from the B fields, one image is formed. After that, various image processes are performed by not-shown circuits in the post stage.

As described in detail above, in the image data processing circuit 10 according to the first embodiment, values of the dark current component signals in the lines 10 to 20 can be corrected in accordance with the head line average value RD by the correction circuit 1. As a result, the values of the dark current component signals in the lines 10 to 20 are adjusted to the predetermined value (=8). Therefore, also in the case where line dependency of the dark current component data DD that the dark current component data DD increases/decreases in proportional to increase in the line count value LC exists, the influence can be suppressed by the correction circuit 1. Therefore, at the time of eliminating the dark current component from data of one frame of an image by the frame OB correcting unit 14 after that, the dark current component can be eliminated without line dependency. Thus, the reference signal level corresponding to black in an image is determined with high precision, and all of the effective pixel data ED can be corrected with the determined reference signal level.

The subtraction circuit 13 subtracts the detection value OBLD itself from the effective pixel data ED and the dark current component data DD of the line presently entered to the subtraction circuit 13. Consequently, irrespective of the detection value OBLD, the values of the dark current component data DD can be adjusted to a predetermined value according to the head line average value RD with high precision.

The reference average value generating circuit 2 uses, as the head line average value RD, the average value of the dark current average values LAV in the lines 1 to 8. The measurement average value generating circuit 16 uses, as the preceding line average value ADD, the average value of the dark current average values LAV in a selected line and seven lines preceding the selected line. Consequently, even in the case where an abnormal value caused by a defective pixel or the like is included in the dark current component data DD, the head line average value RD and the preceding line average value ADD do not largely fluctuate due to the abnormal value. That is, by using an average value of values in eight lines as each of the head line average value RD and the preceding line average value ADD, the effect of an LPF is obtained. It prevents the dark current average value LAV from sharply fluctuating among the lines. Consequently, also in the case of performing OB correction on the line unit basis, occurrence of line flicker can be prevented.

In the limiter 15, an increase/decrease value from the correction value LOD of last time, of the correction value OD of a line which is being entered presently is set so as not to exceed the increase permitted value OBLTH or decrease permitted value OBLTL. Since the step of increasing/decreasing the correction value OD can be limited to be within a predetermined range, the correction value OD is prevented from sharply fluctuating. Therefore, occurrence of line flicker can be prevented.

Figure 7:
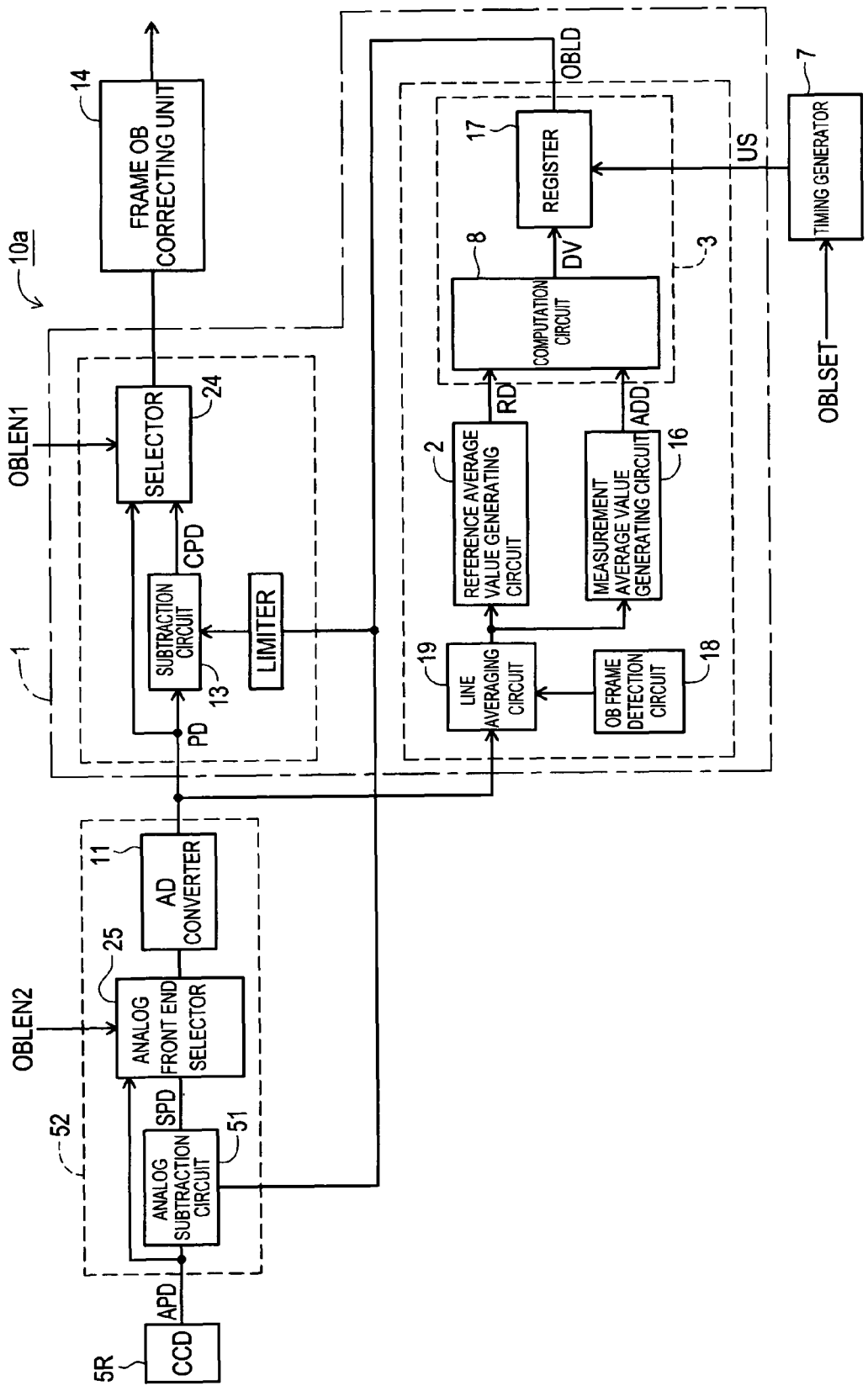

An image data processing circuit 10a according to a second embodiment of the invention will be described with reference to FIG. 7. The image data processing circuit 10a has, in addition to the components of the image data processing circuit 10 shown in FIG. 2, an analog subtraction circuit 51 and an analog front end selector 25. By the analog subtraction circuit 51, the analog front end selector 25, and the AD converter 11, an analog front end 52 is formed. To the analog subtraction circuit 51, the analog pixel data APD output from the CCD sensor 5R and a detection value OBLD output from the register 17 are entered. To the analog front end selector 25, a correction permit signal OBLEN2, subtracted pixel data SPD which is output from the analog subtraction circuit 51, and the analog pixel data APD output from the CCD sensor 5R is entered. The output of the analog front end selector 25 is entered to the AD converter 11. To the register 17, the update signal US is entered every four counts of a line count value LC by the timing generator 7. Since the other configuration is similar to the configuration of the image data processing circuit 10 shown in FIG. 2, its detailed description will not be repeated here.

Figure 8:
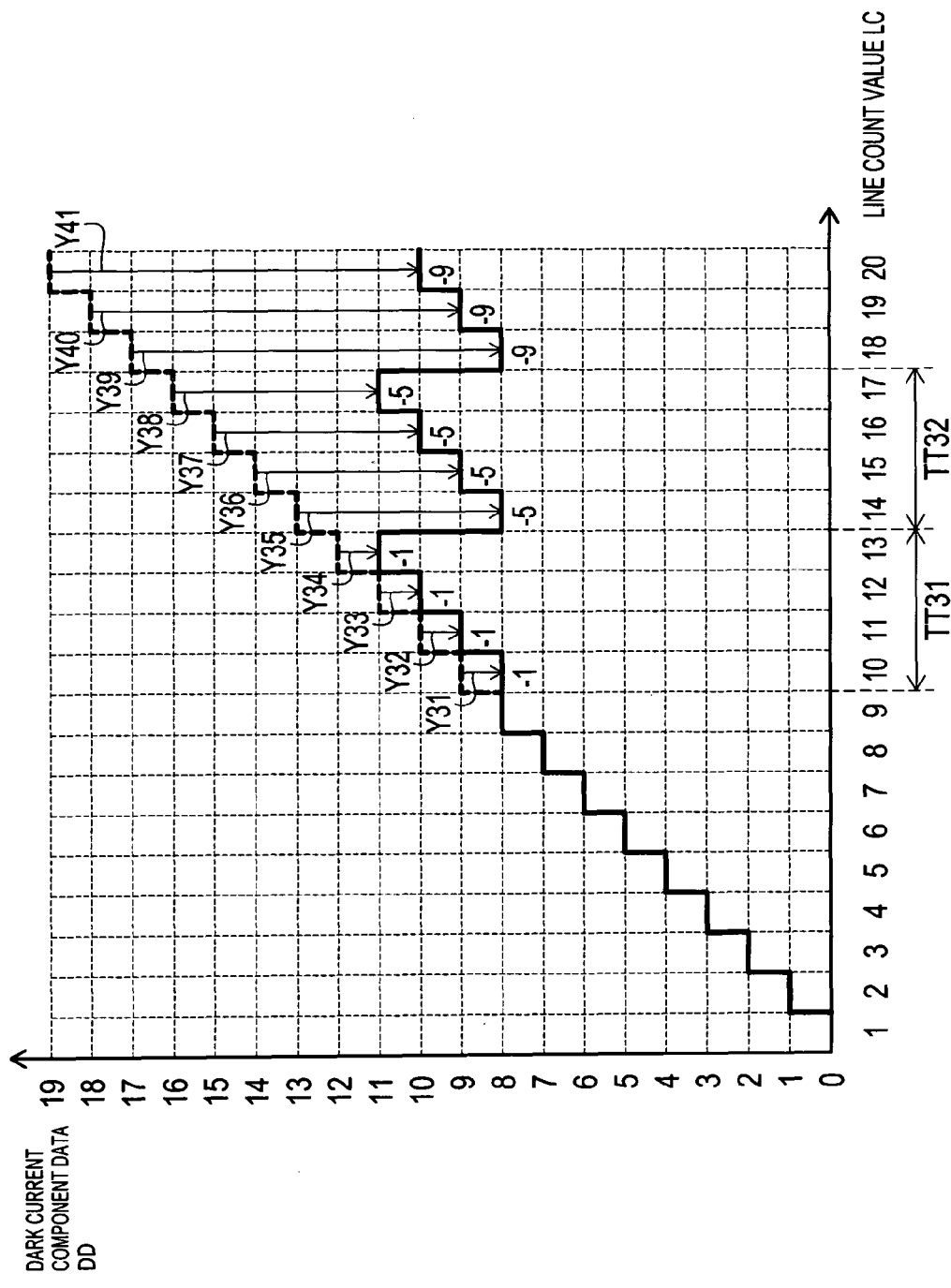
FIG. 8 is a graph (No. 2) showing the correlation between the dark current component data DD and the line count value LC.

The action of the analog front end 52 in the image data processing circuit 10a will be described with reference to FIG. 8. FIG. 8 is a diagram showing the correlation between the dark current component data DD and the line count value LC. First, when the correction permit signal OBLEN2 that permits subtracting process in the analog front end 52 is supplied from a not-shown control circuit to the analog front end selector 25, the analog front end selector 25 selects and outputs the subtracted pixel data SPD. When a correction permit signal OBLEN1 which does not permit the subtracting process in the subtraction circuit 13 is supplied from a not-shown control circuit to the selector 24, the selector 24 selects and outputs the pixel data PD, so that the subtraction circuit 13 is bypassed. When the line count value LC changes from 9 to 10, the preceding line average value ADD (=5.5) of values in the lines 2 to 9 is output from the measurement average value generating circuit 16. The value of the change amount DV output from the computation circuit 8 is set as "1". Since the register 17 captures the change amount DV of 1 in accordance with the update signal US, the detection value OBLD becomes "1". The analog subtraction circuit 51 subtracts the correction value OD (=1) from the effective pixel data ED and the dark current component data DD of the line 10 entered. By the calculation, as shown in FIG. 8, the value of the dark current component data DD in the line 10 is decreased from "9" to "8" (arrow Y31).

The update signal US is preset so as to be entered every four counts of the line count value LC by the update frequency set value OBLSET. The update frequency set value OBLSET can be determined according to the operation speed of the analog front end 52. Therefore, the register 17 does not capture the change amount DV in the period TT31 from 10 to 13 of the line count value LC, so that the detection value OBLD is fixed at "1". Thus, the detection value OBLD is fixed at "1" in the lines 11 to 13 (arrows Y32 to Y34).

Next, when the line count value LC changes from 13 to 14, the preceding line average value ADD (=9.5) of values in the lines 6 to 13 is output from the measurement average value generating circuit 16. The value of the change amount DV output from the computation circuit 8 is set to "5". Since the register 17 captures the change amount DV of 5 in accordance with the update signal US, the detection value OBLD is set to "5". By the calculation, the detection value OBLD is fixed at "5" in the period TT32 from 14 to 17 in the line count value LC. Therefore, as shown in FIG. 8, the detection value OBLD (=5) is subtracted from the dark current component data DD in the lines 14 to 17 (arrows Y35 to Y38).

Similarly, in the period TT33 from 18 to 20 in the line count value LC, the value of the detection signal OBLD is fixed at "9". Therefore, as shown in FIG. 8, the detection value OBLD (=9) is subtracted from the dark current component data DD in the lines 18 to 20 (arrows Y39 to Y41).

The analog front end selector 25 selects the subtracted pixel data SPD which is output from the analog subtraction circuit 51 and outputs it to the AD converter 11 in accordance with the correction permit signal OBLEN2, and the pixel data SPD is converted to digital data by the AD converter 11. The selector 24 selects the pixel data PD output from the AD converter 11 in accordance with the correction permit signal OBLEN1 and outputs the pixel data PD to the frame OB correcting unit 14. Therefore, the subtraction circuit 13 is bypassed.

It is understood from the above that, in the correction circuit 1 according to the invention, the process of subtracting the detection value OBLD from data output from the CCD sensor 5R can be performed in a digital manner in the line OB correcting unit 4 and also in an analog manner in the analog front end 52. Therefore, in the image data processing apparatus having the correction circuit 1, as necessary, OB correction by digital process and OB correction by analog process can be selectively made. Thus, the circuit design can have flexibility.

Also in the case where the operation of the analog front end 52 is slow and the detection value OBLD cannot be updated every line, the update frequency of the detection value OBLD can be adjusted by properly changing transmission frequency of the update signal US. Thus, variations among lines and line dependency of the dark current component data DD can be eliminated.

Figure 9:
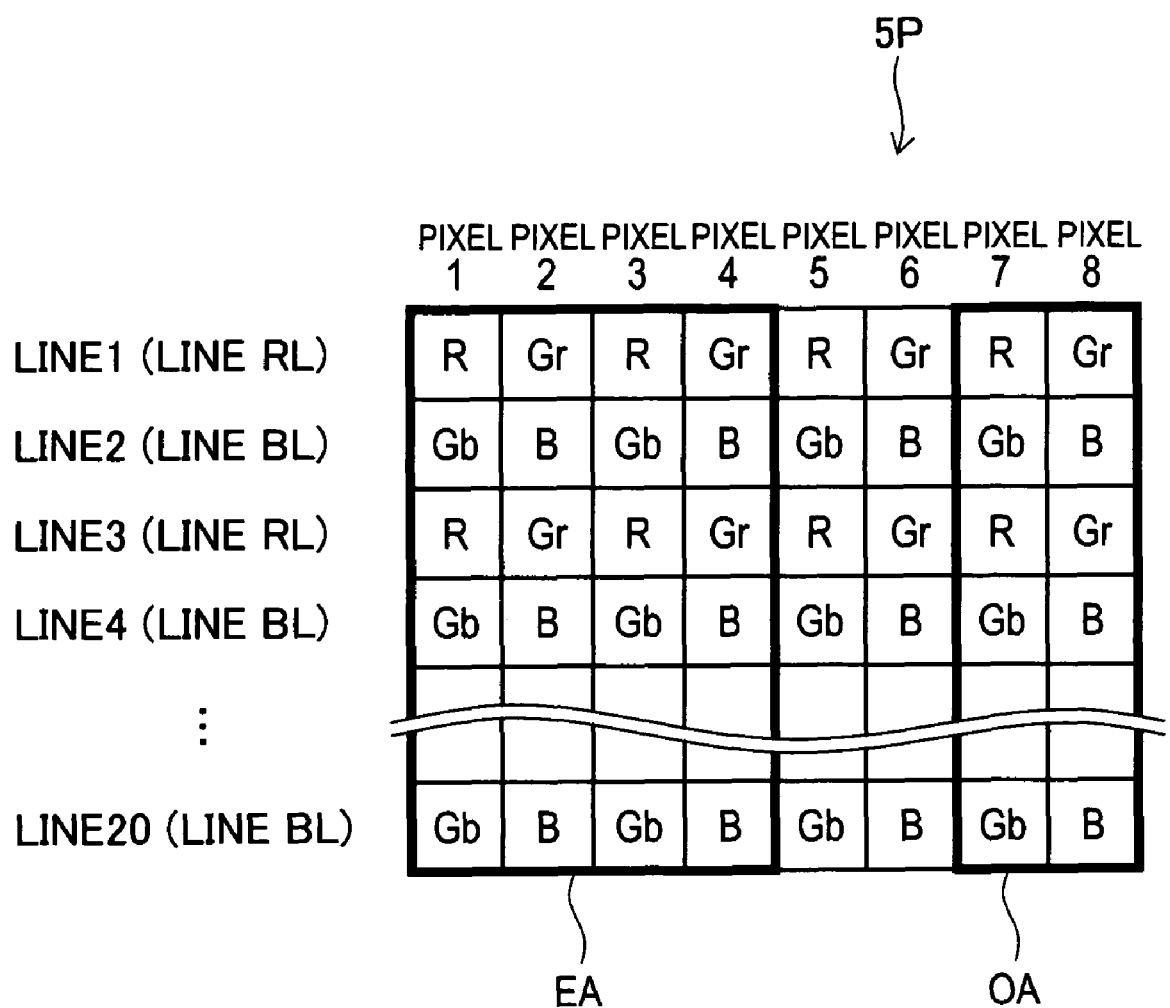
FIG. 9 is a diagram showing a progressive CCD sensor 5p.

Obviously, the present invention is not limited to the foregoing embodiments but can be variously improved and modified without departing from the gist of the present invention. Although an interlace CCD sensor has been described in the embodiments, the invention is not limited to the interlace CCD sensor. Obviously, the invention can be also applied to a progressive CCD. A progressive CCD sensor 5p is shown in FIG. 9. The CCD sensor 5p has a configuration in which lines RL having pixels of R and Gr and lines BL having pixels of Gb and B are arranged alternately. The CCD sensor 5p outputs data of the lines RL when the line count value LC is an odd number, and outputs data of the lines BL when the line count value LC is an even number. Two image data processing circuits 10 shown in FIG. 2 are provided in correspondence with the lines RL and the lines BL. Since the other configuration is similar to the configuration of the image data processing circuit 10 shown in FIG. 2, its detailed description will not be repeated here.

The OB correcting method in the lines RL will be described with reference to FIG. 10. FIG. 10 is a graph showing the correlation between the dark current component data DD and the line count value LC. First, the head line average value RD-R in the lines RL is obtained. The head line average value RD-R is an average value of dark current average values LAV in the first four lines (lines 1, 3, 5, and 7) of the lines RL and is set to "4". When the line count value LC changes from 9 to 10 after that, the preceding line average value ADD-R (=6) in the preceding four lines (lines 3, 5, 7, and 9) is obtained. The correction value OD-R in the lines RL is set to "2". Therefore, as shown in FIG. 10, the correction value OD-R is subtracted from the dark current component data DD in the line 11 supplied to the subtraction circuit 13 (arrow Y41). Similarly, when the line count value LC changes from 11 to 12, the preceding line average value ADD-R (=8) is updated, and the correction value OD-R is updated to "4", so that the correction value OD-R (=4) is subtracted from the dark current component data DD in the line 13 (arrow Y43).

Similarly, the OB correcting method in the lines BL will be described. First, a head line average value RD-B in the lines BL is obtained. The head line average value RD-R is an average value of the dark current average values LAV in the first four lines (lines 2, 4, 6, and 8) of the lines BL, and is set to "5". When the line count value LC changes from 10 to 11, the preceding line average value ADD-B (=6) in the preceding four lines (lines 4, 6, 8, and 10) is obtained. The correction value OD-B in the lines BL is set to "2". Therefore, as shown in FIG. 10, the correction value OD-B is subtracted from the dark current component data DD in the line 12 that is entered to the subtraction circuit 13 (arrow Y42). Similarly, when the line count value LC changes from 12 to 13, the correction value OD-B is updated to "4", so that the correction value OD-B is subtracted from the dark current component data DD in the line 14 (arrow Y44). By repeating the operation, the invention can be applied also to the progressive CCD.

Although the limiter 15 and the line averaging circuit 19 are provided to prevent the correction value OD from sharply fluctuating among lines in the embodiments, the invention is not limited to the configuration. Alternately, in the image data processing circuit 10a shown in FIG. 7, in place of the line averaging circuit 19 and the OB frame detection circuit 18, a mask circuit for masking data exceeding a predetermined threshold in the dark current component data DD entered may be provided. With the configuration, even in the case where an abnormal value caused by a defective pixel or the like is included in the dark current component data DD, the abnormal value can be prevented from being captured by the reference average value generating circuit 2 and the measurement average value generating circuit 16, so that the head line average value RD and the preceding line average value ADD do not largely fluctuate. Since the change amount DV and the detection value OBLD are prevented from sharply fluctuating among lines, also in the case of making the OB correction every line, occurrence of line flicker can be prevented.

Although an average value of values in eight lines is used as each of the head line average value RD and the preceding line average value ADD in the embodiments, the invention is not limited to the mode. For example, it is also possible to provide a register for holding the number of lines for obtaining an average and obtaining an average of values of the number corresponding to the value held in the register. Consequently, according to the image size and visibility of an image, the parameter of an average value can be varied.

In the embodiment, variations among lines and line dependency of the dark current component data DD are eliminated in the correction circuit 1. The dark current component is eliminated from data of one frame in an image by the frame OB correcting unit 14. However, the invention is not limited to the mode. Obviously, by setting the head line average value RD to a value which does not include the dark current component, the dark current component can be eliminated from data of one image frame in the correction circuit 1. For example, by setting the head line average value RD to "0" in FIG. 6, the dark current component data DD in the line 10 is decreased from 9 to 0 in the subtraction circuit 13. Similarly, the correction values OD=10, 11, 12, ..., and 19 are subtracted from the dark current component data DD=10, 11, 12, ..., and 19 in the lines 11, 12, 13, ..., and 20, respectively. Therefore, at the line count value LC of 10 or larger, the value of the dark current component data DD can be set to a predetermined value (=0). It can make the frame OB correcting unit 14 unnecessary.

Although the CCD sensor 5R has been described as a solid state image pickup device in the embodiment, obviously, the invention can be also applied to other devices such as a CMOS sensor.

In the embodiment, when the change amount DV is a negative value, the computation circuit 8 outputs the change amount DV clipped to "0" to the register 17. However, the invention is not limited to the mode. Obviously, the computation circuit 8 may not clip the change amount DV. In this case, the computation circuit 8 can deal with both positive and negative values as the change amount DV. As a result, also in the case where the dark current component data DD whose level is lower than that of the head line average value RD is entered, correction of adjusting the values of the dark current component data DD in lines to a predetermined value according to the head line average value RD can be made. Obviously, the limiter 15 can deal with the change amount DV of a negative value. Specifically, there is the case where the change amount VV becomes a negative value in correspondence with the negative change amount DV. In this case, the comparing circuit 21 determines whether the change amount VV decreases by more than the decrease permission value OBLTL or not. Obviously, the subtraction circuit 13 can perform not only subtraction but also addition. Specifically, there is the case where the correction value OD becomes a negative value in correspondence with the negative change amount DV. In this case, by subtracting a negative value in the subtraction circuit 13, as a result, adding operation is performed in the subtraction circuit 13. It is understood from the above that the invention is effective not only in the case where the dark current component data DD monotonously increases as the line count value LC increases, but also in the case where the dark current component data DD varies among lines and the correlation with the line count value LC of the dark current component data DD is nonlinear (for example, in the case where the correlation has sin waveform). The correction of adjusting values of the dark current component data DD in the lines to a predetermined value according to the head line average value RD can be performed. The invention is effective also in the case where the dark current component data DD decreases (for example, monotonously decreases) as the line count value LC increases.

The dark current component data DD is an example of a dark current component signal, the reference average value generating circuit 2 is an example of a first holding circuit, the head line average value RD is an example of a reference dark current component signal, the detection value OBLD is an example of a dark current change amount, the storage 23 is an example of a second holding circuit, the subtraction circuit 13 is an example of a first subtraction circuit, the analog subtraction circuit 51 is an example of a second subtraction circuit, the analog front end selector 25 is an example of a first selector, the selector 24 is an example of a second selector, the clamp circuit 22 is an example of a first limiter, and the clamp circuit 22 is an example of a second limiter.

The image data processing circuit and the image data processing method of the present invention can make correction with high precision so as to suppress occurrence of line dependency and variations among lines in a dark current component included in image data output from a solid state image pickup device, and can prevent occurrence of line flicker.

What is claimed is:

1. An image data processing circuit of a solid state image pickup device from which a dark current component signal and a pixel signal are sequentially output on a line unit basis, comprising:
   a first holding circuit for holding the dark current component signal in a reference line as a reference dark current component signal;
   a first subtraction circuit to which the dark current component signal and the pixel signal are sequentially entered on the line unit basis;
   a differential circuit for obtaining, as a dark current change amount, a change amount with respect to the reference dark current component signal, of the dark current component signal included in a preceding line output from the solid state image pickup device prior to the line entered to the first subtraction circuit;
   a second subtraction circuit to which the dark current component signal and the pixel signal as analog signals output from the solid state image pickup device are entered;
   a first selector to which an output of the solid state image pickup device and an output of the second subtraction circuit are entered;
   an AD converter provided on a connection path between the first selector and the first subtraction circuit and converting an analog output of the first selector to a digital output; and
   a second selector to which an output of the first subtraction circuit and an output of the AD converter are entered,
   wherein the first subtraction circuit subtracts the dark current change amount from the dark current component signal and the pixel signal which are entered,
   wherein in the case where a subtracting process of subtracting the dark current change amount from the dark current component signal and the pixel signal is performed in the first subtraction circuit, the first selector selects an output of the solid state image pickup device and the second selector selects an output of the first subtraction circuit, and
   wherein in the case where the subtracting process is performed in the second subtraction circuit, the first selector selects an output of the second subtraction circuit and the second selector selects an output of the AD converter.

2. An image data processing circuit according to claim 1, wherein the first holding circuit sets "i" lines from the first line to the i-th line (where i is a natural number of 2 or larger) as the reference lines and holds an average value of the dark current component signals included in the reference lines as the reference dark current component signal, and the subtraction circuit uses, as the preceding lines, the (i+1)th line and subsequent lines which are j lines (j: natural number of two or larger) preceding the line entered to the first subtraction circuit and obtains, as a dark current change amount, a change amount with respect to the reference dark current component signal, of an average value of the dark current component signals included in the preceding lines.

3. An image data processing circuit according to claim 1, wherein the first holding circuit uses a first line as the reference line, and holds an average value of the dark current component signals included in the reference line as the reference dark current component signal, and the differential circuit uses, as the preceding line, a line which is any of the second and subsequent lines and immediately precedes the line entered to the first subtraction circuit and obtains, as a dark current change amount, a change amount with respect to the reference dark current component signal, of an average of the dark current component signals included in the preceding line.

4. An image data processing circuit according to claim 1, further comprising:

a second holding circuit for holding, as a dark current change amount of last time, the dark current change amount in the line immediately preceding the line entered to the first subtraction circuit; and a first limiter, when an increase amount of the dark current change amount in the line entered to the first subtraction circuit with respect to the dark current change amount of last time exceeds a predetermined increase amount upper limit value, using, as the dark current change amount, a value obtained by adding the increase amount upper limit value to the dark current change amount of last time.

5. An image data processing circuit according to claim 4, wherein when the change amount with respect to the dark current change amount of last time, of the dark current change amount is a negative value, the first limiter sets the value of the dark current change amount to zero.

6. An image data processing circuit according to claim 1, further comprising:

a second holding circuit for holding, as a dark current change amount of last time, the dark current change amount in the line immediately preceding the line entered to the first subtraction circuit; and a second limiter, when a decrease amount with respect to the dark current change amount of last time, of the dark current change amount in the line entered to the first subtraction circuit exceeds a predetermined decrease amount upper limit value, using, as the dark current change amount, a value obtained by subtracting the decrease amount upper limit value from the dark current change amount of last time.

7. An image data processing circuit according to claim 6, wherein when the change amount with respect to the dark current change amount of last time, of the dark current change amount is a positive value, the second limiting circuit sets the value of the dark current change amount to zero.

8. An image data processing circuit according to claim 1, further comprising a mask circuit which is provided on a connection path between the solid state image pickup device and the first holding circuit and the differential circuit and masks the dark current component signal exceeding a predetermined dark current component signal threshold.

9. An image data processing circuit according to claim 1, wherein the differential circuit updates the dark current change amount every predetermined number of preceding lines.

10. An image data processing method of a solid state image pickup device from which a dark current component signal and a pixel signal are sequentially output on a line unit basis, comprising:

holding the dark current component signal in a reference line as a reference dark current component signal;

entering the dark current component signal and the pixel signal sequentially on the line unit basis to a first circuit;

obtaining, as a dark current change amount, a change amount with respect to the reference dark current component signal, of the dark current component signal included in a preceding line output from the solid state image pickup device prior to the line entered to the first circuit;

entering the dark current component signal and the pixel signal as analog signals output from the solid state image pickup device to a second circuit;

entering an output of the solid state image pickup device and an output of the second circuit to a first selector;

AD-converting an analog output of the first selector to a digital output;

entering the digital output by the AD-converting to the first circuit;

entering an output of the first circuit and the digital output by the AD-converting to a second selector; and subtracting the dark current change amount from the dark current component signal and the pixel signal by the first circuit;

in the case where a subtracting process of subtracting the dark current change amount from the dark current component signal and the pixel signal is performed in the first circuit:

selecting an output of the solid state image pickup device by the first selector; and selecting an output of the first circuit by the second selector;

in the case where the subtracting process performed in the second circuit:

selecting an output of the second circuit by the first selector; and selecting the digital output by the AD-converting by the second selector.

* * * * *